United States Patent [19]

Colman

[11] 4,124,793
[45] Nov. 7, 1978

[54] AQUARIUM WATER HEATER

[75] Inventor: Robert Colman, New York, N.Y.

[73] Assignee: Metaframe Corporation, Elmwood Park, N.J.

[21] Appl. No.: 869,123

[22] Filed: Jan. 13, 1978

[51] Int. Cl.² ............................................. H05B 3/80
[52] U.S. Cl. .................... 219/523; 219/318; 219/331; 219/494; 219/515
[58] Field of Search ............... 219/318, 328, 331, 333, 219/336, 473, 494, 510, 515, 523; 119/5

[56] References Cited

U.S. PATENT DOCUMENTS

| 2,477,363 | 7/1949 | Danner | 219/473 |
|---|---|---|---|
| 2,666,838 | 1/1954 | Krah et al. | 219/515 |
| 2,811,629 | 10/1957 | Danner | 219/523 |
| 2,839,660 | 6/1958 | Davies | 219/534 |
| 3,107,290 | 10/1963 | Willinger | 219/494 |
| 3,371,192 | 2/1968 | Rosenel | 219/523 |
| 3,564,589 | 2/1971 | Arak | 219/331 |
| 3,576,426 | 4/1971 | Sesholtz | 219/523 |
| 3,619,565 | 11/1971 | D'Elia | 219/523 |
| 3,731,058 | 5/1973 | Bleiweiss | 219/523 |
| 3,746,836 | 7/1973 | Summerfield et al. | 219/328 |
| 3,796,858 | 3/1974 | Cohn | 219/331 |
| 3,895,217 | 7/1975 | Hall et al. | 219/523 |
| 3,896,289 | 7/1975 | Di Renna | 219/523 |

Primary Examiner—Volodymyr Y. Mayewsky
Attorney, Agent, or Firm—John G. Mesaros; John M. May; Stephen L. King

[57] ABSTRACT

An aquarium water heater having a heater element energized by first and second silicon-controlled rectifiers connected in parallel in opposing conductive relation, one rectifier providing energy to the heater element on one-half cycle of alternating current while simultaneouly charging a capacitor which is connected to the gate electrode of the second rectifier for rendering the second rectifier conductive on the other half cycle of alternating current to supply energy to the heater element. Circuit means are connected to the gate electrode of the first rectifier, the circuit means including a thermistor for sensing the water temperature and rendering the first rectifier non-conductive when the water temperature equals a set point determined by a rheostat in the circuit means.

11 Claims, 2 Drawing Figures

AQUARIUM WATER HEATER

BACKGROUND OF THE INVENTION

The background of the invention will be discussed in two parts:

1. Field of the Invention

This invention relates to aquarium heaters, and more particularly to an electrical temperature responsive aquarium heater.

2. Description of the Prior Art

In aquariums having tropical or exotic fish, control of the water temperature within a very narrow range is desirable. Such water temperature control is generally accomplished by means of an aquarium water heater which includes an immersible glass tube adapted to be supported by a wall of the aquarium housing and suspended therefrom with the glass tube immersed in the water. The glass tube contains a heater element adjacent the bottom thereof in thermally conductive relation with the glass tube for transmitting heat to the water. Also included within the tube is a suitable temperature responsive device for controlling the transmission of alternating current power to the heater element, such a device usually including a bimetallic element adjustable by means of a knob or the like extending externally of the tube.

Another aquarium heater is shown in U.S. Pat. No. 3,896,289 which utilized a bi-directional thyristor in series with the heater element with a zero voltage switch which electrically actuates the triac or bi-directional thyristor. Control of the triac permits or halts the flow of all current to the heater. A negative temperature coefficient thermistor is utilized to sense the water temperature, the thermistor being suitably encased for positioning within the water externally of the glass tube housing.

It is an object of the present invention to provide a new and improved aquarium water heater utilizing silicon-controlled rectifiers to energize the heater element.

It is another object of the invention to provide a new and improved aquarium water heater control circuit in which one silicon-controlled rectifier provides power to the heater element on one-half the alternating current cycle while simultaneously charging a capacitor, the capacitor discharging on the other half of the alternating current cycle to render a second silicon-controlled rectifier conductive to energize the heater element.

SUMMARY OF THE INVENTION

The foregoing and other objects of the invention are accomplished by providing an aquarium water heater adapted to be energized from an alternating current source and having a heater element connected in series with a parallel arrangement of a first and second silicon-controlled rectifiers in opposing conductive relation, each of the rectifiers having a gate electrode. The first rectifier is normally conductive during one-half cycle of the alternating current, and during this half cycle a capacitor is charged through a diode to store energy thereon. During the other half cycle of alternating current, the capacitor discharges through a discharge loop connected to the gate electrode of the second rectifier to render the second rectifier conductive. Circuit means are provided for controlling the gate electrode of the first rectifier, the circuit means including a thermistor connected as a first arm in a voltage divider, the second arm including a variable rheostat utilized to establish a "set point" temperature. The voltage divider is connected in parallel with a Zener diode to establish a generally constant voltage source. With the thermistor resistance sensing a temperature at or near the set point, the voltage at the mid-point energizes transistor switch means which switch the gate electrode to the same potential as the cathode of the first rectifier to thereby render it nonconductive. With the temperature sensed by the thermistor being below the set point resistance, the voltage divider is unbalanced and de-energizes the transistor switch means with the gate electrode receiving a differentiated applied voltage pulse to render the first rectifier conductive.

Other objects, features and advantages of the invention will become apparent upon a reading of the specification when taken in conjunction with the drawings in which like referenced numerals in the several views refer to like elements.

DESCRIPTION OF THE PREFERRED EMBODIMENT

Figure 1:
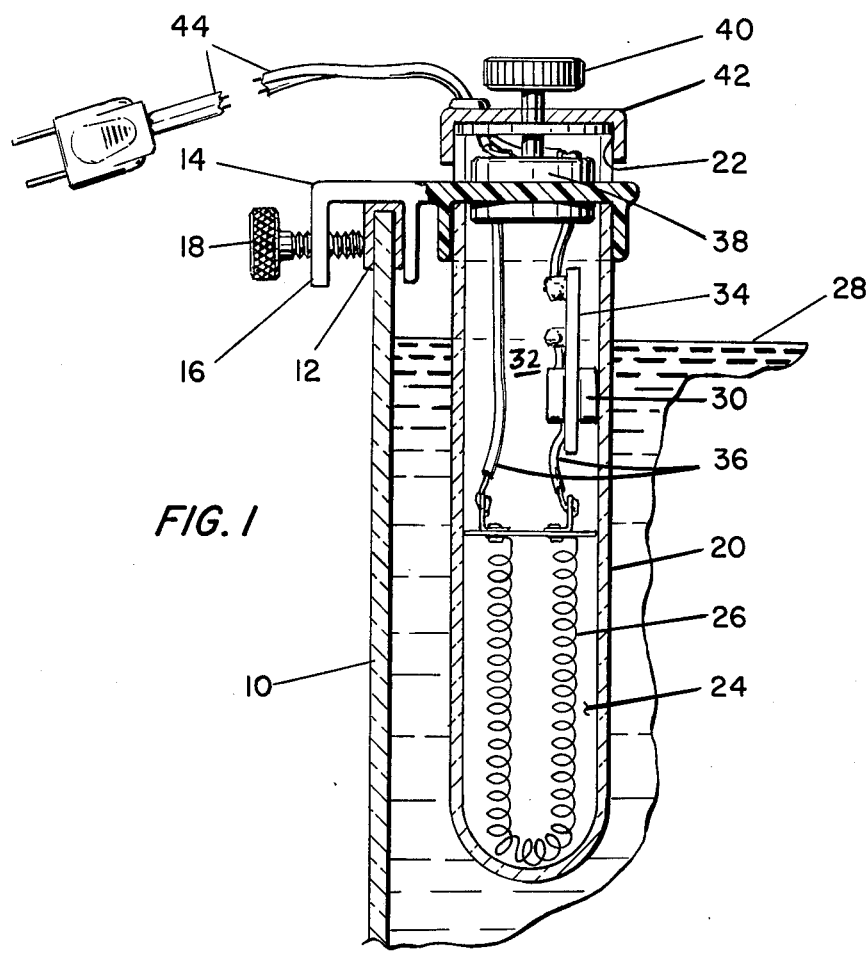
FIG. 1 is a side elevational view of an aquarium water heater according to the invention.

Referring now to the drawings and particularly to FIG. 1, there is shown a portion of an aquarium including a glass wall 10, with a frame 12 extending about the periphery of the upper edge thereof. Supported by the frame 12 is a support member 14 having a generally inverted U-shaped section 16 through which a thumb screw 18 extending through one arm thereof for fastening to the frame 12 between the arms of the inverted U-shaped section 16. The supporting member 14 extends inwardly to support an elongate tube 20, which is preferably made of a heat resistant glass, the tube 20 having an open end 22 for insertion of the components therein. Positioned within the tube 20 adjacent the bottom thereof is a ceramic block 24 about which heating coils 26 are suitably wound to be in close proximate relation to the sidewalls of tube 20 to provide the necessary heating to be transferred to the water within the aquarium. The overall dimension of the tube 20 is such that it extends beneath the water level, generally designated 28, within the aquarium.

Immediately above the ceramic block 24, suitable electrical components are housed within the tube 20 and includes a temperature sensing component 30, which is a thermistor in the present invention, the thermistor 30 being so-positioned within the tube 20 as to be spaced from the heating elements 26 but yet in conductive relation with the surrounding water within the acquarium in order to sense the temperature thereof and control the electronics as will hereinafter be discussed. Mounted within the upper portion 32 of the tube 20 is an electrical circuit, generally designated 34, which is electrically connected to the heater coil 26 by means of suitable wires 36 and to a rheostat 38 which is located adjacent the opening 22 of tube 20. The rheostat 38 is provided with an adjusting means 40 which extends externally of the tube 20 through a suitable cap 42, the cap 42 suitably sealing the open end of tube 20. Also extending out through the cap 42 is an electrical power cord 44 for connection to a suitable source of alternating current, which in the typical residence is approximately 117 volts. The adjusting means 40 is used to control or adjust the desired temperature of the water within the aquarium, the cap 42 and the adjusting knob 40 are suitably inscribed for that purpose.

Figure 2:
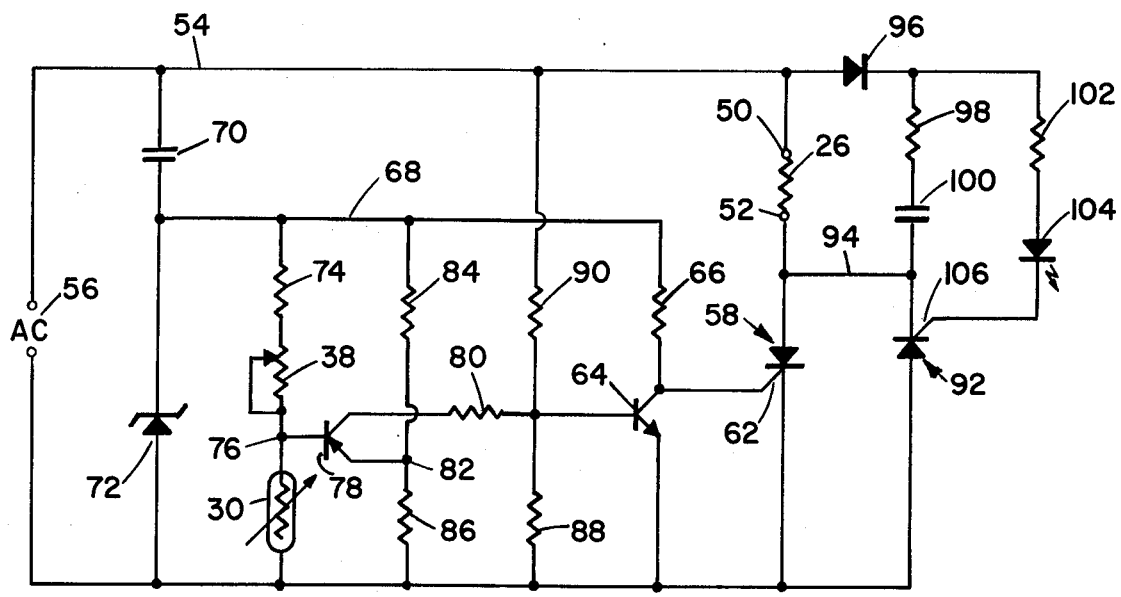
FIG. 2 is a schematic diagram of the heater element control circuit used in the aquarium water heater of FIG. 1.

Referring now to FIG. 2, the electrical circuitry for controlling the heat element will be discussed. In FIG. 2, the heater element 26 is connected between the terminals 50 and 52, terminal 50 being connected over lead 54 to one terminal of the alternating current voltage source 56, while terminal 52 is connecated to the anode of a first silicon-controlled rectifier 58 with the cathode thereof connected to lead 60 which is connected to the other terminal of the alternating current voltage source 56. The gate electrode 62 of the silicon-controlled rectifier 58 is connected to the collector or an NPN transistor 64, the emitter of which is coupled to lead 60. The gate electrode 62 of rectifier 58 is also coupled through a resistor 66 over lead 68 in series with a capacitor 70 the other end of which is coupled to lead 54. A Zener diode 72 has the anode thereof coupled to lead 60 and the cathode thereof coupled to lead 68. In parallel with the Zener diode 72 is a voltage divider network between leads 60 and 68 which includes a fixed resistor 74 in series with a variable resistor or rheostat 38 in series with a thermistor 30. The voltage divider network provides the first arm which includes the rheostat 38 and the fixed resistor 74 while the second arm includes the thermistor 30. The rheostat 38 is that previously discussed in connection with FIG. 1 which is variable to provide the "set" temperature desired by the hobbyist for the water in his aquarium. The mid-point 76 between the two arms of the voltage divider is coupled to the base of a PNP transistor 78 which has the collector thereof coupled through a resistor 80 to the base of transistor 64. The emitter of transistor 78 is coupled to the mid-point 82 of a biasing voltage divider including a resistor 84 connected in series with a resistor 86 between leads 60 and 68, the mid-point 82 being the interconnection point between resistors 84 and 86.

The base of transistor 64 is connected through a fixed resistor 88 to lead 60 and also through another fixed resistor 90 to lead 54, leads 54 and 60, respectively, being connected to opposite terminals of the alternating current voltage source 56.

A second silicon-controlled rectifier 92 is connected in opposing conductive relation with the first silicon-controlled rectifier 62, that is, the cathode of rectifier 92 is coupled to the anode of rectifier 62 by means of lead 94 while the anode of rectifier 92 is coupled to lead 60 which has the cathode of rectifier 58 connected thereto. Terminal 50 of the heater 26 is coupled to the anode of the diode 96, the cathode of which is connected through a fixed resistor 98 in series with a capacitor 100, the other end of which is coupled to the cathode of rectifier 92. The cathode of diode 96 is also coupled through a fixed resistor 102 through a light emitting diode 104 to the gate electrode 106 of silicon-controlled rectifier 92.

The components utilized in the circuit of FIG. 2 are as follows:
Resistor 74: 2,000 ohms
Resistors 84, 86, and 80: 1,000 ohms
Resistors 90: 130,000 ohms
Resistors 66 and 102: 22,000 ohms
Resistor 98: 2,200 ohms
Resistor 88: 4,700 ohms
Capacitor 70: 0.2 microfarads
Capacitor 100: 0.047 microfarads
Resistor 38: 1,000 ohm trimmer
Transistor 78: 2N3702
Transistor 64: 2N3393
Diode 96: Silicon diode, 100V PIV
Zener Diode 72: 10 volt plus or minus 10%
Silicon-Controlled Rectifiers 58 and 92: 200V PIV, 2.5 amperes
Thermistor 30: 2,500 ohms at 22° C.
LED 104: Red Indicator Diode The operation of the circuit of FIG. 2 will now be discussed. Briefly, the silicon-controlled rectifiers 58 and 92 are gated to become conductive on alternate half cycles to provide full wave power to the heater 26. As can be seen, the rectifiers 58 and 92 are connected in opposing conductive relation to be alternatively in series with the heater 26 with the gate electrodes 62 and 106, respectively, thereof being controlled in response to the applied alternating current voltage crossing through the zero axis.

The Zener diode 72 provides a voltage level on lead 68 which is generally constant and free from line voltage fluctuations the voltage appearing on lead 68 being utilized to bias transistors 78 and 64, as well as to provide the reference voltage across the voltage divider having the first arm thereof including resistor 74 and rheostat 38 with the second arm thereof including the thermistor 30. The thermistor 30 is a variable resistor, the resistance of which varies in relation to the temperature thereof. With rheostat 38 at a "set point", that is, indicating the temperature desired, and with thermistor 30 sensing water temperature corresponding to the set point, transistor 78 is nonconductive and similarly transistor 64 is non-conductive. With transistors 78 and 64 non-conductive, with alternating current applied to the circuit, capacitor 70 and resistor 66 differentiate the applied voltage, applying this differentiated pulse to the gate electrode 62 of silicon-controlled rectifier 58 during the positive half cycle of alternating current voltage. Current from the voltage source 56 then flows through lead 54 through the heater coil 26 through the silicon-controlled rectifier 58 over lead 60 to the other terminal of the alternating current voltage source 56. Simultaneously, current flowing through lead 54 flows through diode 96 to charge capacitor 100 through resistor 98, the circuit of diode 96, resistor 98 and capacitor 100 being essentially in parallel with the heater coil 26.

As the applied alternating current voltage crosses through the zero axis diode 96 no longer conducts and capacitor 100 is charged to a voltage level close to the supply voltage, the capacitor 100 then discharging through resistor 98 through resistor 102 through light emitting diode 104 to apply a voltage signal to the gate electrode 106 of silicon-controlled rectifier 92 thereby rendering the rectifier 92 conductive to apply the negative going power from alternating current source 56 over lead 60 through rectifier 92 over lead 94 through heater element 26 through lead 54 to the other terminal of the alternating current voltage source 56. During this negative half cycle of the alternating current voltage rectifier 58, due to its polarity of connections, has no current flowing therethrough. With the rectifiers 58 and 92 connected in this manner, heater coil 26 is receiving full wave power through alternate half cycles from rectifiers 58 and 92, respectively. This occurs so long as the resistance of thermistor 30 with reference to the set point resistance of rheostat 38 is at or below the desired temperature.

When the water temperature rises to or above the set point, the resistance of thermistor 30 changes with respect to the set point resistance of rheostat 38 to change the voltage appearing at mid-point 76 of the voltage divider. This renders transistor 78 conductive to thereby apply the voltage sensed at the mid-point 82 of the voltage divider consisting of resistors 84 and 86 through current-limiting resistor 80 to the base of transistor 64 thereby gating transistor 64 or rendering it conductive. When transistor 64 conducts the emitter thereof is at or very near the potential existing on lead 60 thereby causing the voltage appearing on gate electrode 62 to substantially equal the voltage appearing at the cathode of si-icon-controlled rectifier 58 thereby rendering rectifier 58 non-conductive. With rectifier 58 turned "off" the alternating current voltage appearing between leads 54 and 60 has no conductive path through the heater coil 26 due to the non-conductive state of rectifier 58. With silicon-controlled rectifier 58 non-conductive, lead 94 is effectively an "open" circuit and there is no path to charge capacitor 100. With no path to charge capacitor 100, the gate electrode 106 of the second silicon-controlled rectifier 92 has no bias voltage appearing thereon thereby causing rectifier 92 to remain in its non-conductive or "off" condition.

As the temperature of the water within the aquarium drops, this drop in temperature will be sensed by the thermistor 30, the resistance of which will correspondingly change to again render transistor 78 non-conductive and correspondingly render transistor 64 non-conductive. When this occurs, the sequence will repeat itself with silicon-controlled rectifiers 58 and 92, on alternate half cycles of the alternating current voltage, providing power to the heater coil 26.

During those portions of time where the capacitor 100 is discharging through the light emitting diode 104, the diode 104 will be illuminated to visually indicate that the heater 26 is being energized. Although the diode 104 will only be energized on alternate half cycles, the alternate half cycles are sufficient to maintain from a visual standpoint a constant illumination of the light emitting diode 104.

In summary, the circuit provides means for energizing the heater coil 26 on the positive half cycle while simultaneously charging a capacitor and means responsive to the crossing through the zero axis to discharge the capacitor to provide power to the heater coil 26 on the negative half cycle, the power being provided alternatively through first and second silicon-controlled rectifiers 58 and 92, respectively. A temperature sensing circuit is provided to render the first silicon-controlled rectifier 58 non-conductive in response to the sensed temperature detected by thermistor 30 being above the set point temperature or reference temperature determined by the setting of rheostat 38. The non-conduction of the first silicon-controlled rectifier 58 "opens" the charging path for the capacitor 100 to also render the second silicon-controlled rectifier 92 non-conductive as a result thereof.

While there has been show and described a preferred embodiment, it is to be understood that various other adaptations and modifications may be made within the spirit and scope of the invention.

What is claimed is:

1. In an aquarium water heater adapted to be energized from an alternating current source, said aquarium water heater having a heath conductive tube for receiving components therein, the combination comprising:
    an electrical heater element;
    first and second controllable rectifier means connected in parallel and opposing conductive relation with each other and in series with said heater element;
    means responsive to application of alternating current power for rendering said first rectifier means conductive to permit the flow of current therethrough and through said heater element during one-half the cycle of the alternating current power source;
    means responsive to the conduction of said first rectifier means for storing electrical energy;
    means for rendering said second rectifier means conductive on the other half cycle of said alternating current power source in response to the energy so stored whereby to provide full wave power to said heater element;
    temperature sensitive means; and
    circuit means responsive to said temperature sensitive means for disabling said means for rendering said first rectifier means conductive, whereby to render said second rectifier means non-conductive.

2. The combination according to claim 1 wherein said means for storing electrical energy includes a capacitor which is charged in response to conduction of said first rectifier means.

3. The combination according to claim 2 wherein said means for rendering said second rectifier means conductive includes a discharge path for conducting the energy said capacitor to the control element of said second rectifier means.

4. The combination according to claim 3 wherein said first and second rectifier means are silicon-controlled rectifers having gate electrodes.

5. The combination according to claim 4 wherein said means for rendering said first rectifier means conductive includes a differentiating circuit connected to the gate electrode of said first rectifier means for applying differentiated pulses from the alternating current power source thereto.

6. The combination according to claim 5 wherein said circuit means includes switch means connected between the gate electrode and cathode of said first rectifier means.

7. The combination according to claim 6 wherein said capacitor is charged through a diode which serves as a blocking diode during the discharge of said capacitor.

8. The combination according to claim 7 wherein said temperature sensitive means includes a thermistor.

9. The combination according to claim 8 wherein said switch means includes a transistor having the emitter to collector circuit thereof coupled between the gate electrode and the cathode of said first rectifier means and said transistor is rendered conductive in response to the resistance of said thermistor.

10. The combination according to claim 9 wherein said thermistor is in one branch of a voltage divider and the other branch of the voltage divider includes a variable rheostat which is positionable to indicate a desired temperature setting.

11. The combination according to claim 10 wherein said transistor of said switch means is controlled by the voltage at the mid-point of said voltage divider.

* * * * *